United States Patent [19]
Descamps et al.

[11] 3,920,707
[45] Nov. 18, 1975

[54] CERTAIN 3-SUBSTITUTED AMINO ALKOXY BENZOYL-2-LOWER ALKYL OR 2-CYCLOALKYL BENZOFURANS

[75] Inventors: Marcel Descamps, Crainhem; Jean Gubin, Brussels; Norbert Claeys, Hamme, all of Belgium

[73] Assignee: Labaz, Paris, France

[22] Filed: Sept. 10, 1973

[21] Appl. No.: 395,847

[30] Foreign Application Priority Data
Sept. 19, 1972  United Kingdom............. 43387/72

[52] U.S. Cl. ............. 260/346.2 R; 260/268 BC; 260/293.58
[51] Int. Cl.²....................................... C07D 307/78
[58] Field of Search... 260/346.2 R, 293.58, 268 BC

[56] References Cited
UNITED STATES PATENTS
3,248,401   4/1966   Tondeur et al. ............. 260/346.2 R Primary Examiner—Henry R. Jiles
Assistant Examiner—Bernard I. Dentz
Attorney, Agent, or Firm—Mason, Kolehmainen, Rathburn & Wyss

[57] ABSTRACT

Benzofuran compounds of the general formula:

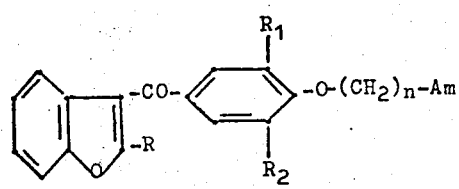

and the pharmaceutically acceptable acid addition salts thereof, wherein R represents a branched- or straight-chain alkyl group containing from 1 to 4 carbon atoms or a cyclohexyl radical; $R_1$ and $R_2$, which are identical, each represent a hydrogen atom or a straight-chain alkyl group containing from 1 to 3 carbon atoms; Am represents a dimethylamino, diethylamino, di-n-propylamino, di-n-butylamino, piperidino, N-methyl-piperazino, N-ethyl-piperazino, N-n-propyl-piperazino, N-phenyl-piperazino, methyl-n-butylamino, ethyl-n-butylamino, methylamino, ethylamino, n-propylamino, isopropylamino or n-butylamino group and n is an integer in the range of from 3 to 6 inclusive.

4 Claims, No Drawings

CERTAIN 3-SUBSTITUTED AMINO ALKOXY BENZOYL-2-LOWER ALKYL OR 2-CYCLOALKYL BENZOFURANS

This invention relates to benzofuran derivatives and to pharmaceutical compositions containing the same. The invention also relates to a process for preparing the benzofuran derivatives.

The benzofuran derivatives with which the present invention is concerned are the compounds represented by the general formula:

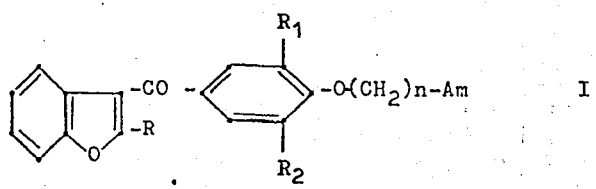

and the pharmaceutically acceptable acid addition salts thereof, wherein R represents a branched- or straight-chain alkyl group containing from 1 to 4 carbon atoms or a cyclohexyl radical; $R_1$ and $R_2$, which are identical, each represent a hydrogen atom or a straight-chain alkyl group containing from 1 to 3 carbon atoms; Am represents a dimethylamino, diethylamino, di-n-propylamino, di-n-butylamino, piperidino, N-methyl-piperazino, N-ethyl-piperazino, N-n-propyl-piperazino, N-phenyl-piperazino, methyl-n-butylamino, ethyl-n-butylamino, methylamino, ethylamino, n-propylamino, isopropylamino or n-butylamino group and n is an integer in the range of from 3 to 6 inclusive.

The compounds of formula I can be prepared by condensing, advantageously in an inert organic medium such as, for example, dimethylformamide, an alkali metal salt, preferably the potassium or sodium salt, of an appropriately substituted benzofuran derivative represented by the general formula:

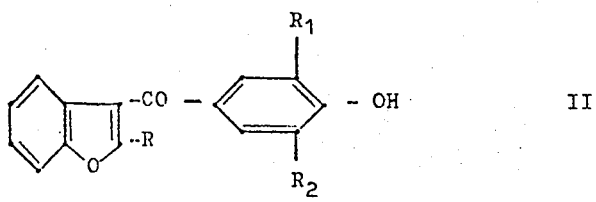

in which R, $R_1$ and $R_2$ have the same meanings as in formula I, with a dibromoalkane of the general formula:

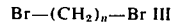
Br—$(CH_2)_n$—Br   III in which n has the same meanings as in formula I, to form a bromoalkoxy-substituted compound of the general formula:

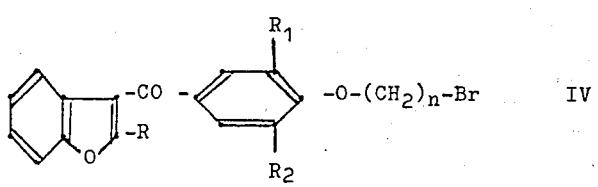

in which R, $R_1$, $R_2$ and n have the same meanings as in formula I, and condensing the compound of formula IV with an amine of the general formula:

H—Am    V in which Am has the same meaning as in formula I, the condensation advantageously being effected in an inert organic solvent such as, for example, benzene, to form the required benzofuran derivative of formula I, which, if desired, is reacted with an appropriate acid to provide a pharmaceutically acceptable acid addition salt thereof.

The compounds of formula I in which n is 3 and Am has the meaning defined above with the exception of the secondary amino groups, may alternatively be prepared by condensing, advantageously in an inert organic medium such as, for example, benzene or dichloroethane, an alkali metal salt, preferably the potassium or sodium salt, of an appropriately substituted benzofuran derivative represented by the general formula:

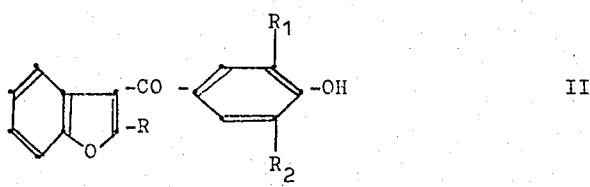

in which R, $R_1$ and $R_2$ have the same meanings as in formula I, with an alkylamino derivative represented by the general formula:

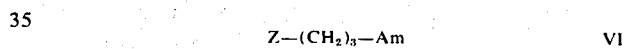
Z—$(CH_2)_3$—Am    VI or an acid addition salt thereof, in which Z is a halogen atom or a tosyloxy radical and Am represents a dimethylamino, diethylamino, di-n-propylamino, di-n-butylamino, piperidino, N-methyl-piperazino, N-ethyl-piperazino, N-n-propyl-piperazino, N-phenyl-piperazino, methyl-n-butylamino or ethyl-n-butyl-amino group, to form the required compound of formula I which, if desired, is reacted with an appropriate acid to provide a pharmaceutically acceptable acid addition salt of the benzofuran derivative of formula I.

The compounds of formula II in which $R_1$ and $R_2$ represent hydrogen are either known compounds, having been described in British patent specification No. 836,272, or may be prepared from the corresponding 2-substituted-benzofurans by the method described in the said British specification.

The compounds of formula II in which $R_1$ and $R_2$ each represent a straight-chain alkyl group containing from 1 to 3 carbon atoms may be prepared by condensing by Friedel-Crafts reaction, a 2,6-dialkyl-anisole of the general formula:

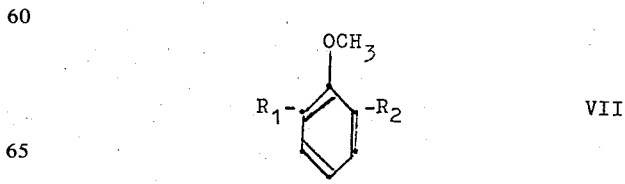

wherein $R_1$ and $R_2$ have the foregoing meaning, with a 3-carboxy-benzofuran acid chloride of the general formula:

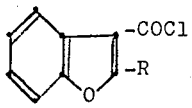

VIII wherein R has the same meaning as in formula I, to give the corresponding 3-anisoyl-benzofuran of the general formula:

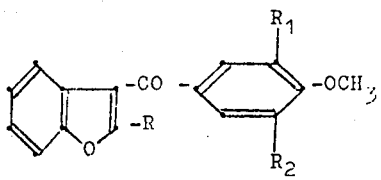

IX wherein R, $R_1$ and $R_2$ have the aforesaid meanings. The compounds of formula IX are then demethylated with pyridine hydrochloride to give the corresponding compound of formula II.

The anisoles of formula VII in which $R_1$ and $R_2$ represent methyl or ethyl are already known, having been published respectively by Baldwin and Robinson in the J. Chem. Soc. 1264 (1934) and by N. I. Shrukin, L. A. Erivanskaya and V. V. An Vestnik in Moskov Univ., Ser. Mat., Mekh., Astron., Fiz. i. Khim. 12, 1No. 5, 125 (1957). The anisole in which $R_1$ and $R_2$ represent n-propyl may be prepared by the method described in the aforesaid J. Chem. Soc. reference.

The compounds of formula VIII may be synthesized by known procedures from the corresponding benzofuroic acids which may be prepared by the method described by R. Royer, E. Bisagni and C. Hudry in Bull. Soc. Chim. Fr., 933 (1961).

The benzofuran derivatives of the invention have been found to possess useful pharmacological properties which render them of particular value in the treatment of angina pectoris.

The study of anti-anginal medication based upon benzoylsubstituted benzofurans has been in progress for a number of years and has led to the adoption of two very successful anti-anginal drugs, namely a. 2-ethyl-3-(3,5-diiodo-4-hydroxy-benzoyl)-benzofuran, which has been employed for a long time against angina pectoris and is available under various trademarks of which the most widely used is Amplivix, and b. 2-n-butyl-3-(3,5-diiodo-4-β-N-diethylaminoethoxybenzoyl)-benzofuran, which has proved to be in many ways superior to Amplivix as an anti-anginal agent and has been widely employed in clinical practice for a considerable time, being available under the trademark Cordarone.

These two compounds were adopted for clinical use, as may be expected, by reason of their outstanding activity in the field of angina pectoris as compared with the other compounds of the respective series to which each drug belongs. The series of which Amplivix is a member is described in our British patent specification No. 836,272 and that of which Cordarone is a member in our British patent specification No. 995,367.

Examination of these earlier specifications shows that in each series there are compounds characterised by a bernzoyl ring substituted in the 3- and 5-positions either by a halogen or by a hydrogen atom. From the fact that the compound adopted for clinical use in each series contains a diiodinated benzoyl ring, it may be reasonably deduced that only when the benzoyl ring is so substituted does the benzofuran present the required degree of activity for successful use as an anti-anginal drug.

This deduction is confirmed by our more recent investigations as recently published in the specification of our Belgian Pat. No. 766,392 and in the corresponding German Offenlegungschrift No. 2,130,480. These specifications also describe anti-anginal benzofurans bearing a substituted benzoyl ring. However, in this case, the substitutents on the benzoyl ring are strictly limited to the halogens and once again the preferred compounds are diiodinated.

It is a recognized medical principle that iodine-bearing drugs are best avoided if at all possible. The regular administration of an iodine-bearing substance can lead to undesirable side-effects particularly with respect to the proper functioning of the thyroid gland. Furthermore, such drugs tend to render extremly difficult any accurate examination of the thyroid.

The problem which arose was, therefore, that of finding suitable anti-anginal drugs which, while having a degree of therapeutic activity sufficient to justify their adoption in clinical practice were devoid of iodine substituents.

In the light of the prior art, such drugs could not normally be created from benzoyl-bearing benzofurans since diiodination of the benzoyl radical appeared to be a necessary condition for suitable anti-anginal activity.

It has however been discovered quite unexpectedly that the replacement of the iodine atom by hydrogen or a lower alkyl group enables compounds to be obtained which, on the pharmacological plane, possess all the properties which make them admirable replacement agents for the diiodinated compounds already existing. In the case of hydrogen, this discovery was quite contrary to what would normally have been expected from previous experience with the anti-anginal drugs of the Amplifix and Cordarone series. In the case of the lower alkyl radicals, it was a completely novel conception in no way suggested by the prior art.

Amongst the preferred compounds of the present invention are the following:

2-cyclohexyl-3-(4-γ-di-n-butylaminopropoxy-benzoyl)-benzofuran (Compound 1)

2-ethyl-3-(3,5-dimethyl-4-γ-di-n-butylaminopropoxybenzoyl)-benzofuran (Compound 2) and 2-n-propyl-3-(3,5-dimethyl-4-γ-n-butylaminopropoxybenzoyl)benzofuran (Compound 3), and the pharmaceutically acceptable acid addition salts thereof, for example the hydrochlorides. These salts are normally used for studying the pharmacological properties of the compounds.

As the series of compounds described in the above-mentioned Belgian and German specifications is not only very active but also closely related chemically to the compounds of the present invention, a comparison was made between preferred Compounds 1, 2 and 3 mentioned above and the principal preferred compound of the aforesaid Belgian and German specifications, namely 2-n-butyl-3-(3,5-diiodo-4-γ-dimethylaminopropoxy-benzoyl)-benzofuran in the form of its hydrochloride (Compound Z).

The tests used were those described in detail under the references A, B, C and D in the said Belgian and German specifications. They may be set out briefly as follows:

Test A: The compound is administered intravenously to the normal anaesthetized dog and the reduction in heart-rate noted in terms of a percentage of the initial rate.

Test B: Same procedure as in Test A except that the reduction in blood-pressure is recorded as a percentage of the initial pressure.

Test C: The heart-rate of a atropinized dog is accelerated with isoprenaline and the difference between the maximum accelerated heart-rate and the initial heart-rate noted and expressed as a percentage of the latter. This percentage may be referred to as X. When the effects of the isoprenaline have disappeared the animal is given the compounds to be tested and the same quantity of isoprenaline as before is administered. The difference beween the maximum accelerated heart-rate and the heart-rate before the second administration of isoprenaline is recorded and expressed as a percentage of the latter. This percentage may be referred to as Y. Finally, Y is subtracted from X and the resultant registered as a percentage of X.

Test D: The same procedure as in Test C is followed for the purpose of determining the capacity of the compounds being tested to reduce adrenalin-increased blood-pressure in the antropinized dog.

In the first series of tests, intravenous injections of 10 mg./kg. of the compounds being tested were used and it was found that Compounds 1, 2 and 3 of the present invention were fully as active as the main preferred compound of the Belgian and German specifications cited above, i.e. Compound Z. All four compounds caused a reduction in heart-rate of at least 40% in test A, a reduction in blood-pressure of at least 20% in test B and corresponding reductions of at least 50% in Tests C and D.

Tests were then carried out using an intravenous dose of only 5 mg./kg. of the compounds being studied. In these tests it was found that, at 5 mg./kg., Compounds 1, 2 and 3 of the present invention caused a 30% reduction in heart-rate in Test A while the results in Tests B, C and D were approximately the same as those obtained with a dose of 10 mg./kg. The results observed with compound Z were a 15% reduction in heart-rate in Test A, a 10% reduction in blood-pressure in Test B and 35% reductions in Tests C and D. This means that, contrary to what might be expected, an intravenous dose of 5 mg./kg. of Compounds 1, 2 and 3 of the present invention exerted an effect which compared very favorably with that obtained with an intravenous dose of 10 mg./kg. of Compound Z.

Angina pectoris is one of the most difficult diseases to treat, principally because of the numerous psychological factors involved. For this reason, it is certain that no one single drug can be developed which is completely effective in all cases. Thus it is imperative that the physician should have at his disposal a selection of drugs from which he can choose that which is most suitable for a particular case. Moreover, it very often happens that for various reasons the physician finds it advantageous to switch from one drug to another in order more effectively to combat a particular phase of the disease. The compounds of the present invention constitute such a replacement medication and, by reason of their marked activity, provide the physician with the variety of weapons which he requires to being relief to the anginal patient.

Acute toxicity test were also carried out on the mouse and the rat.

In the rat, the $LD_{50}$ of Compounds 2 and 3 were found to be 3000 mg/kg and 3250 mg/kg by intragastric route and 400 mg/kg for each compound by intraperitoneal route. These results were obtained after a 7-day period of observation.

Compound 1 showed a $LD_{50}$ of 2750 mg/kg by intragastric route after a 12-day observation period and 240 mg/kg by intraperitoneal route after a 7-day period of observation.

In mice the $LD_{50}$ of Compound 2 was found to be 2500 mg/kg by intragastric route after a 7-day period of observation.

These different results show that the safety margin between the dose required to obtain an optimal effect and the toxic dose is very great.

It will be appreciated that for therapeutic use the compounds of the invention will normally be administered in the form of a pharmaceutical composition, which may be in a dosage unit form appropriate to the desired mode of administration. Thus the pharmaceutical composition may be a dosage unit form suitable for oral administration, for example, a coated or uncoated tablet or a hard- or soft-gelatin capsule, or suitable for rectal administration, for example, a suppository.

Irrespective of the form which the composition takes, the pharmaceutical composition will normally comprise at least one of the compounds of formula I or a pharmaceutically acceptable acid addition salt thereof associated with an appropriate pharmaceutical excipient comprising, for example, one or more of the following substances: milk sugar, starches, talc, magnesium stearate, polyvinylpyrrolidone, alginic acid, colloidal silica or flavouring agent.

The following Examples illustrate the invention:

EXAMPLE 1

Preparation of 2-ethyl-3-(3,5-dimethyl-4-γ-di-n-butylamino-propoxy-benzoyl)-benzofuran hydrochloride.

a. Preparation of a 2-ethyl-3-chlorocarbonyl-benzofuran

In a 250 ml flask were refluxed for one hour 19 g (0.1 mol) of 2-ethyl-3-carboxy-benzofuran acid (m.p. 117°C) and 100 ml of thionyl chloride. The excess of thionyl chloride was distilled off and the residue distilled under 14 mm of Hg.

In this manner, 15.1 g. of 2-ethyl-3-chlorocarbonyl-benzofuran were obtained, melting at 34°C., which represents a yield of 72.5%.

By following the same procedure as that described above but using the appropriate starting-products, the compounds listed hereunder were prepared:

| Compound | Melting point °C. or Refraction Index. |
|---|---|
| From 2-methyl-3-carboxy-benzofuran acid: | |
| 2-methyl-3-chlorocarbonyl-benzofuran | 55 |
| From 2-n-propyl-3-carboxy-benzofuran acid: | |
| 2-n-propyl-3-chlorocarbonyl-benzofuran | 29 |
| From 2-isopropyl-3-carboxy-benzofuran acid: | |
| 2-isopropyl-3-chlorocarbonyl-benzofuran | 53 |
| From 2-n-butyl-3-carboxy-benzofuran acid: | |
| 2-n-butyl-3-chlorocarbonyl-benzofuran | $n_D^{27} = 1.5606$ |
| From 2-cyclohexyl-3-carboxy-benzofuran acid: | |
| 2-cyclohexyl-3-chlorocarbonyl-benzofuran | 68 | so obtained was distilled under 0.3 mm. of Hg.

In this manner, 30.9 g. of 2-ethyl-3-(3,5-dimethyl-4-methoxybenzoyl)-benzofuran were obtained, melting at 175°–180°C., which represents a yield of 66%.

By following the same procedure as that described above but using the appropriate starting-products, the compounds listed hereunder were prepared:

| Compound | |
|---|---|
| 2-methyl-3-(3,5-dimethyl-4-methoxy-benzoyl)-benzofuran | m.p. 86°C |
| 2-n-propyl-3-(3,5-dimethyl-4-methoxy-benzoyl)-benzofuran | oily - not crystallized |
| 2-n-butyl-3-(3,5-dimethyl-4-methoxy-benzoyl)-benzofuran | b.p. 180°C./0.2 mm. Hg. |
| 2-ethyl-3-(3,5-diethyl-4-methoxy-benzoyl)-benzofuran | oily - not crystallized |
| 2-n-butyl-3-(3,5-diethyl-4-methoxy-benzoyl)-benzofuran | oily - not crystallized |
| 2-isopropyl-3-(3,5-dimethyl-4-methoxy-benzoyl)-benzofuran | oily - not crystallized |
| 2-cyclohexyl-3-(3,5-dimethyl-4-methoxy-benzoyl)-benzofuran | b.p. 185°C./0.06 mm. Hg. |
| 2-n-propyl-3-(3,5-diethyl-4-methoxy-benzoyl)-benzofuran | oily - not crystallized |
| 2-ethyl-3-(3,5-di-n-propyl-4-methoxy-benzoyl)-benzofuran | oily - not crystallized |
| 2-n-propyl-3-(3,5-di-n-propyl-4-methoxy-benzoyl)-benzofuran | oily - not crystallized |
| 2-n-butyl-3-(3,5-di-n-propyl-4-methoxy-benzoyl)-benzofuran | oily - not crystallized | b. Preparation of 2-ethyl-3-(3,5-dimethyl-4-methoxy-benzoyl)-benzofuran

Into a half-liter flask fitted with a mechanical stirrer were introduced 31.3 g. (0.15 mol) of 2-ethyl-3-chlorocarbonyl-benzofuran, 20.4 g. (0.15 mol) of 2,6-dimethyl-anisole and 120 ml. of 1,2-dichloroethane. The solution was cooled to 5°C. by means of an ice-bath after which 30 g. (0.225 mol) of aluminium chloride were introduced gradually while stirring, care being taken to maintain the temperature between 5° and 10°C. At the end of this operation the mixture was brought up to room-temperature and stirring was maintained for 16 hours. The complex so formed was decomposed with 120 ml. of a 5N hydrochloric acid solution. The organic phase was decanted, washed with a sodium hydroxide solution and then with water. After drying, the solvent was evaporated out and the residue c. Preparation of 2-ethyl-3-(3,5-dimethyl-4-hydroxy-benzoyl)-benzofuran Into a half-liter flask were introduced 30.9 g (0.1 mol) of 2-ethyl-3-(3,5-dimethyl-4-methoxy-benzoyl)-benzofuran and 150 g. of pyridine hydrochloride. The mixture was heated to 220°C. for 30 minutes and then poured into slightly acidified ice and extracted with ether. The ethereal solution was washed with water, dried over anhydrous sodium sulphate and then evaporated to dryness.

In this manner, 24.3 g. of 2-ethyl-3-(3,5-dimethyl-4-hydroxy-benzoyl)-benzofuran were obtained, melting at 148°C. after recrystallisation from petroleum ether (b.p. 100°–120°C) which represents a yield of 82.5%.

By following the same procedure as that described above but using the appropriate starting-products, the compounds listed hereunder were prepared:

| Compound | Melting point °C. |
|---|---|
| 2-methyl-3-(3,5-dimethyl-4-hydroxy-benzoyl)-benzofuran | 139 |
| 2-n-propyl-3-(3,5-dimethyl-4-hydroxy-benzoyl)-benzofuran | 128 |
| 2-isopropyl-3-(3,5-dimethyl-4-hydroxy-benzoyl)-benzofuran | 146 |
| 2-n-butyl-3-(3,5-dimethyl-4-hydroxy-benzoyl)-benzofuran | 139 |
| 2-ethyl-3-(3,5-diethyl-4-hydroxy-benzoyl)-benzofuran | 147 |
| 2-n-butyl-3-(3,5-diethyl-4-hydroxy-benzoyl)-benzofuran | 112 |
| 2-cyclohexyl-3-(3,5-dimethyl-4-hydroxy-benzoyl)-benzofuran | 167 |
| 2-n-propyl-3-(3,5-diethyl-4-hydroxy-benzoyl)-benzofuran | 100 |
| 2-ethyl-3-(3,5-di-n-propyl-4-hydroxy-benzoyl)-benzofuran | 107 |
| 2-n-propyl-3-(3,5-di-n-propyl-4-hydroxy-benzoyl)-benzofuran | 104 |
| 2-n-butyl-3-(3,5-di-n-propyl-4-hydroxy-benzoyl)-benzofuran | 77 | d. Preparation of 2-ethyl-3-(3,5-dimethyl-4-γ-bromopropoxy-benzoyl)-benzofuran

A suspension of 8.83 g. (0.03 mol) of 2-ethyl-3-(3,5-dimethyl-4-hydroxy-benzoyl)-benzofuran and 8.5 g. (0.06 mol) of potassium carbonate in 100 ml. of dimethylformamide was stirred for one hour at room-temperature. To this mixture were added 30.3 g. (0.15 mol) of 1,3-di-bromopropane and stirring was maintained for 72 hours. The reaction medium was then diluted with water and extracted with ether. The organic phase was dried and evaporated to dryness. The oily residue so obtained was purified by chromatography on a neutral alumina column.

In this manner, 8.6 g. of 2-ethyl-3-(3,5-dimethyl-4-γ-bromo-propoxy-benzoyl)-benzofuran were obtained which represents a yield of 69%.

By following the same procedure as that described above but using the appropriate starting-products, the compounds listed hereunder were prepared:

| Compound | Melting point °C. |
|---|---|
| 2-n-propyl-3-(3,5-diethyl-4-γ-bromopropoxy-benzoyl)-benzofuran | 71 |
| 2-ethyl-3-(3,5-di-n-propyl-4-γ-bromopropoxy-benzoyl)-benzofuran | oily - not crystallized |
| 2-n-propyl-3-(3,5-di-n-propyl-4-γ-bromopropoxy-benzoyl)-benzofuran | oily - not crystallized |
| 2-n-butyl-3-(3,5-di-n-propyl-4-γ-bromopropoxy-benzoyl)-benzofuran | oily - not crystallized | e. Preparation of 2-ethyl-3-(3,5-dimethyl-4-γ-di-n-butylaminopropoxy-benzoyl)-benzofuran hydrochloride To a solution comprising 8.6 g. (0.02 mol) of 2-ethyl-3-(3,5-dimethyl-4-γ-bromopropoxy-benzoyl)-benzofuran obtained as described above in 40 ml. of benzene were added 12.9g (0.1 mol) of di-n-butylamine. The mixture was allowed to react at 40°C. for 7 days and was then diluted with water and extracted with ether. The organic phase was dried and evaporated under vacuum, care being taken to eliminate the excess of amine. The oily residue so obtained was taken up in dry ether and the hydrochloride of the desired product was precipitated by adding an ethereal solution of hydrochloric acid.

In this manner, 3.8 g. of 2-ethyl-3-(3,5-dimethyl-4-γ-di-n-butylaminopropoxy-benzoyl)-benzofuran hydrochloride, melting at 110°C., were obtained which represents a yield of 38%.

By following the same procedure as that described above, but using the appropriate starting-products, the compounds listed hereunder were prepared:

| Compound | Melting point °C. |
|---|---|
| 2-n-propyl-3-(3,5-dimethyl-4-γ-di-n-butylaminopropoxy-benzoyl)-benzofuran hydrochloride | 101 |
| 2-n-butyl-3-(3,5-diethyl-4-γ-di-n-propylaminopropoxy-benzoyl)-benzofuran hydrochloride | 109 |
| 2-n-propyl-3-(3,5-diethyl-4-γ-di-n-propylaminopropoxy-benzoyl)-benzofuran hydrochloride | 113 |
| 2-n-propyl-3-(3,5-diethyl-4-γ-di-n-butylaminopropoxy-benzoyl)-benzofuran oxalate | 93 |
| 2-ethyl-3-(3,5-di-n-propyl-4-γ-di-n-propylaminopropoxy benzoyl)-benzofuran oxalate | |
| 2-ethyl-3-(3,5-di-n-propyl-4-γ-di-n-butylaminopropoxy-benzoyl)-benzofuran oxalate | 118 |
| 2-n-propyl-3-(3,5-di-n-propyl-4-γ-di-n-propylaminopropoxy-benzoyl)-benzofuran oxalate | 124 – 125 |
| 2-n-propyl-3-(3,5-di-n-propyl-4-γ-di-n-butylaminopropoxy-benzoyl)-benzofuran oxalate | 107 |
| 2-n-butyl-3-(3,5-di-n-propyl-4-γ-di-n-propylaminopropoxy-benzoyl)-benzofuran oxalate | 74 |
| 2-n-butyl-3-(3,5-di-n-propyl-4-γ-di-n-butylaminopropoxy-benzoyl)-benzofuran oxalate | 78 |

EXAMPLE 2

Preparation of a
2-ethyl-3-(3,5-dimethyl-4-γ-di-n-propylamino-
propoxy-benzoyl)-benzofuran hydrochloride.

In a 250 ml. flask equipped with a mechanical stirrer were placed 4.41 g.(0.015 mol) of 2-ethyl-3-(3,5-dimethyl-4-hydroxy-benzoyl)-benzofuran, 6.21 g. (0.045 mol) of anhydrous potassium carbonate, 90 ml. of 1,2-dichloroethane and 2ml. of water. The mixture was refluxed for one hour and allowed to cool after which there were added 3.10 g. (0.0175 mol) of 1-chloro-3-di-n-propylamino-propane. The reaction mixture was heated under reflux for 8 hours and then the solvent was evaporated. The residue so obtained was taken up in ether and water. The ethereal solution was washed with water, dried over anhydrous sodium sulphate and treated with a solution of hydrochloric acid in ether.

In this manner, 3.75 g. of 2-ethyl-3-(3,5-dimethyl-4-γ-di-n-propylaminopropoxy-benzoyl)-benzofuran hydrochloride were obtained, melting at 158°C. after recrystallisation from ethyl acetate, which represents a yield of 53%.

Following the same procedure as that described above but using the appropriate starting-products, the compounds listed hereunder were prepared:

| Compound | Melting point °c. |
| --- | --- |
| 2-methyl-3-(3,5-dimethyl-4-γ-di-n-propylaminopropoxy-benzoyl)-benzofuran hydrochloride | 155 |
| 2-methyl-3-(3,5-dimethyl-4-γ-di-n-butylaminopropoxy-benzoyl)-benzofuran hydrochloride | 147 |
| 2-ethyl-3-(3,5-dimethyl-4-γ-diethylaminopropoxy-benzoyl)-benzofuran hydrochloride | 130 |
| 2-ethyl-3-(3,5-dimethyl-4-γ-di-n-butylaminopropoxy-benzoyl)-benzofuran hydrochloride | 110 |
| 2-ethyl-3-(3,5-dimethyl-4-γ-piperidinopropoxy-benzoyl)-benzofuran oxalate | 181 |
| 2-n-propyl-3-(3,5-dimethyl-4-γ-di-n-propylaminopropoxy-benzoyl)-benzofuran hydrochloride | 130 |
| 2-n-propyl-3-(3,5-dimethyl-4-γ-di-n-butylaminopropoxy-benzoyl)-benzofuran hydrochloride | 101 |
| 2-isopropyl-3-(3,5-dimethyl-4-γ-di-n-propylaminopropoxy-benzoyl)-benzofuran oxalate | 129 |
| 2-n-butyl-3-(3,5-dimethyl-4-γ-diethylaminopropoxy-benzoyl)-benzofuran hydrochloride | 79 |
| 2-n-butyl-3-(3,5-dimethyl-4-γ-di-n-propylaminopropoxy-benzoyl)-benzofuran oxalate | 129 |
| 2-n-butyl-3-(3,5-dimethyl-4-γ-di-n-butylaminopropoxy-benzoyl)-benzofuran oxalate | 81 |
| 2-ethyl-3-(3,5-diethyl-4-γ-di-n-propylaminopropoxy-benzoyl)-benzofuran hydrochloride | 101 |
| 2-n-butyl-3-(3,5-diethyl-4-γ-di-n-propylaminopropoxy-benzoyl)-benzofuran hydrochloride | 109 |
| 2-n-butyl-3-(3,5-diethyl-4-γ-di-n-butylaminopropoxy-benzoyl)-benzofuran hydrochloride | 118 |
| 2-ethyl-3-(3,5-diethyl-4-γ-di-n-butylaminopropoxy-benzoyl)-benzofuran hydrochloride | 131 |
| 2-n-butyl-3-(3,5-diethyl-4-γ-diethylamino-propoxy-benzoyl)-benzofuran oxalate | 126 |
| 2-cyclohexyl-3-(3,5-dimethyl-4-γ-di-n-butyl-aminopropoxy-benzoyl)-benzofuran oxalate | 140 |
| 2-cyclohexyl-3-(3,5-dimethyl-4-γ-di-n-propyl-aminopropoxy-benzoyl)-benzofuran oxalate | 142 |

EXAMPLE 3

Preparation of
2-n-butyl-3-(4-γ-di-n-butylaminopropoxy-benzoyl)-
benzofuran hydrochloride Into a one-liter flask fitted with a mechanical stirrer were introduced 29.4 g (0.1 mol) of 2-n-butyl-3-(4-hydroxy-benzoyl)-benzofuran followed by 27.6 g (0.2 mol) of anhydrous potassium carbonate and 300 ml of dimethylformamide. The resulting mixture was stirred for one hour at room-temperature after which 51 ml (0.5 mol) of 1,3-dibromo-propane were added in one operation. Stirring was maintained for 16 hours at room-temperature and then 600 ml of water were introduced into the reaction medium. The organic phase was decanted and the aqueous phase was extracted with ether. The ethereal phase was added to the organic phase and the resulting solution was washed with water, dried and evaporated under vacuum to dryness. The residue so obtained was finally purified by chromatography on a neutral alumina column. In this way, 27.5 g of 2-n-butyl-3-(4-γ-bromopropoxy-benzoyl)-benzofuran were obtained, in the form of an oil, which represents a yield of 66%.

To a solution containing 9.6 g (0.023 mol) of the product so obtained in 150 ml of benzene were added 7.6 ml (0.046 mol) of di-n-butylamine. The reaction mixture was refluxed for 12 hours and then allowed to cool. The precipitate which formed was eliminated and the benzene solution was washed with water, dried and carefully evaporated to eliminate the excess of amine. The oily residue so obtained was taken up in dry ether and the hydrochloride of the desired product was precipitated by adding to the ethereal solution a solution of hydrochloric acid in ether.

In this manner, 5.7 g of 2-n-butyl-3-(4-γ-di-n-butylamino-propoxy-benzoyl)-benzofuran hydrochloride, melting at 102°C, were obtained, which represents a yield of 50%. By following the same procedure as that described above but using the appropriate starting-products, the compounds listed hereunder were prepared:

| Compound | Melting point °C |
| --- | --- |
| 2-cyclohexyl-3-(4-γ-di-n-butylaminopropoxy-benzoyl)-benzofuran oxalate | 117 |
| 2-n-butyl-3-(4-γ-N-methylbutylaminopropoxy-benzoyl)-benzofuran oxalate | 114-117 |
| 2-n-butyl-3-(4-γ-N-methylpiperazinopropoxy-benzoyl)-benzofuran dihydrochloride | 220 |
| 2-n-butyl-3-(4-γ-N-ethylpiperazinopropoxy-benzoyl)-benzofuran dihydrochloride | 225 |
| 2-n-butyl-3-(4-γ-N-propylpiperazinopropoxy-benzoyl)-benzofuran dihydrochloride | 240 |
| 2-n-butyl-3-(4-γ-N-phenylpiperazinopropoxy-benzoyl)-benzofuran hydrochloride | 148 |
| 2-n-butyl-3-(4-γ-N-ethylbutylaminopropoxy-benzoyl)-benzofuran oxalate | 70 |

EXAMPLE 4

Preparation of
2-ethyl-3-(4-γ-di-n-propylaminopropoxy-benzoyl)-
benzofuran hydrochloride In a 250 ml flask fitted with a mechanical stirrer were placed 5.32 g (0.02 mol) of 2-ethyl-3-(4-hydroxy-benzoyl)-benzofuran, 8.18 g (0.06 mol) of anhydrous potassium carbonate, 120 ml of 1,2-dichloro-ethane and 1 ml of water. The reaction medium was refluxed for one hour and then allowed to cool after which 3.7 g (0.02 mol) of 1-chloro-3-di-n-propylamino-propane were added and the reaction mixture was refluxed for 8 hours. The solvent was evaporated and the residue so obtained was taken up in ether and water. The ethereal solution was washed with water, dried over anhydrous sodium sulphate and finally treated with a solution of hydrochloric acid in ether.

In this manner, 6.2 g of 2-ethyl-3-(4-γ-di-n-propylaminopropoxy-benzoyl)-benzofuran hydrochloride were obtained, melting at 106°C after recrystallization from ethyl acetate, which represents a yield of 71.15%

By following the same procedure as that described above but using the appropriate starting-products, the compounds listed hereunder were prepared:

| Compound | Melting point °C |
| --- | --- |
| 2-methyl-3-(4-γ-di-n-propylaminopropoxy-benzoyl)-benzofuran hydrochloride | 95 |
| 2-isopropyl-3-(4-γ-di-n-propylaminopropoxy-benzoyl)-benzofuran hydrochloride | 101 |
| 2-n-butyl-3-(4-γ-di-n-propylaminopropoxy-benzoyl)-benzofuran oxalate | 107–111 |
| 2-n-butyl-3-(4-γ-di-n-butylaminopropoxy-benzoyl)-benzofuran hydrochloride | 103 |
| 2-methyl-3-(4-γ-di-n-butylaminopropoxy-benzoyl)-benzofuran hydrochloride | 107 |
| 2-ethyl-3-(4-γ-di-n-butylaminopropoxy-benzoyl)-benzofuran oxalate | 94 |
| 2-isopropyl-3-(4-γ-di-n-butylaminopropoxy-benzoyl)-benzofuran hydrochloride | 67 |
| 2-cyclohexyl-3-(4-γ-di-n-propylaminopropoxy-benzoyl)-benzofuran oxalate | 117 |
| 2-cyclohexyl-3-(4-γ-di-n-butylaminopropoxy-benzoyl)-benzofuran oxalate | 117 |
| 2-n-propyl-3-(4-γ-di-n-propylaminopropoxy-benzoyl)-benzofuran oxalate | 116–121 |
| 2-n-propyl-3-(4-γ-di-n-butylaminopropoxy-benzoyl)-benzofuran oxalate | 87–90 |
| 2-n-butyl-3-(4-γ-diethylaminopropoxy-benzoyl)-benzofuran oxalate | 125–126 |
| 2-n-butyl-3-(4-γ-piperidinopropoxy-benzoyl)-benzofuran hydrochloride | 115–117 |
| 2-cyclohexyl-3-(4-γ-diethylaminopropoxy-benzoyl)-benzofuran oxalate | 76 |

EXAMPLE 5

Preparation of 2-n-butyl-3-(3,5-dimethyl-4-γ-dimethylaminopropoxybenzoyl)-benzofuran hydrochloride Into a 250 ml flask fitted with a mechanical stirrer were introduced 6.44 g (0.02 mol) of 2-n-butyl-3-(3,5-dimethyl-4-hydroxy-benzoyl)-benzofuran, 8.18 g (0.06 mol) of anhydrous potassium carbonate and 120 ml of methyl ethyl ketone. The reaction medium was refluxed for one hour, cooled and then 5.87 g (0.02 mol) of 1-dimethyl-amino-3-tosyloxy-propane were added. The mixture was refluxed for 8 hours, the solvent was evaporated and the residue so obtained was taken up in ether and water. The ethereal solution was washed with water, dried over anhydrous sodium sulphate and treated with a solution of hydrochloric acid in ether.

In this manner, 2.7 g of 2-n-butyl-3-(3,5-dimethyl-4-γ-dimethyl-aminopropoxy-benzoyl)-benzofuran hydrochloride were obtained, melting at 125°C after recrystallization from ethyl acetate.

By following the same procedure as that described above but using the appropriate starting-products, the compounds listed hereunder were prepared:

| Compound | Melting point °C |
| --- | --- |
| 2-ethyl-3-(4-γ-dimethylaminopropoxy-benzoyl)-benzofuran hydrochloride | 153 |
| 2-isopropyl-3-(4-γ-dimethylaminopropoxy-benzoyl)-benzofuran hydrochloride | 156 |
| 2-n-butyl-3-(4-γ-dimethylaminopropoxy-benzoyl)-benzofuran hydrochloride | 120 |

EXAMPLE 6

Preparation of 2-n-butyl-3-(4-δ-di-n-propylaminobutoxy-benzoyl)-benzofuran oxalate a. Preparation of 2-n-butyl-3-(4-δ-bromobutoxy-benzoyl)-benzofuran In a 500 ml flask equipped with a mechanical stirrer were placed 14.7 g (0.05 mol) of 2-n-butyl-3-(4-hydroxy-benzoyl)-benzofuran, 10.4 g (0.075 mol) of anhydrous potassium carbonate and 150 ml of dimethyl-formamide. The reaction mixture was stirred for one hour at room temperature and then 56.5 g (0.25 mol) of 1,4-dibromobutane were added. The mixture was heated for 4 hours on a water-bath after which 300 ml of water were added and the organic phase was decanted. The aqueous phase was washed with ether and the ethereal fraction was added to the organic phase. The two collected phases were washed with water, dried and evaporated to dryness. The residue so obtained was distilled under vacuum to eliminate the excess of 1,4-dibromobutane and the new residue was washed with methanol. (The operation of purification could also have been carried out by chromatographing the residue on a dry column using silica as adsorbent agent).

In this manner, 14.4 g of 2-n-butyl-3-(4-δ-bromobutoxybenzoyl)-benzofuran were obtained, in the form of an oil, which represents a yield of 67%.

By following the same procedure as that described above but using the appropriate starting-product, the following compound was prepared:

| Compound | |
| --- | --- |
| 2-ethyl-3-(3,5-dimethyl-4-δ-bromobutoxy-benzoyl)benzofuran | oily - not crystallized | b. Preparation of 2-n-butyl-3-(4-δ-di-n-propylaminobutoxy-benzoyl)-benzofuran oxalate In a 250 ml flask, 4.29 g (0.01 mol) of 2-n-butyl-3-(4-δ-bromobutoxy-benzoyl)-benzofuran, 3.03 g (0.03 mol) of di-n-propyl-amine and 60 ml of benzene were heated to 40°–50°C for 48 hours. The precipitate which formed was filtered out and the solvent and the excess amine were evaporated off. The residue so obtained was taken up in ether. The ethereal solution was washed with water, dried and then treated with a solution of oxalic acid in methanol.

In this manner, 0.9 g of 2-n-butyl-3-(4-δ-di-n-propylamino-butoxy-benzoyl)-benzofuran oxalate was obtained, melting at 102°C after recrystallization from ethyl acetate, which represents a yield of 16.5%.

By following the same procedure as that described above but using the appropriate starting-products, the following compunds were prepared:

| Compound | Melting point °C |
| --- | --- |
| 2-n-butyl-3-(4-δ-piperidinobutoxy-benzoyl)-benzofuran hydrochloride | 151 |
| 2-ethyl-3-(3,5-dimethyl-4-δ-di-n-butyl-aminobutoxy-benzoyl)-benzofuran oxalate | 77 |
| 2-ethyl-3-(3,5-dimethyl-4-δ-di-n-propyl-aminobutoxy-benzoyl)-benzofuran oxalate | 71 |

EXAMPLE 7

Preparation of
2-ethyl-3-(4-ω-di-n-propylaminopentyloxy-benzoyl)-benzofuran oxalate a. Preparation of 2-ethyl-3-(4-ω-bromopentyloxy-benzoyl)-benzofuran Into a 500 ml flask fitted with a mechanical stirrer were introduced 13.3 g (0.05 mol) of 2-ethyl-3-(4-hydroxy-benzoyl)-benzofuran, 10.4 g (0.075 mol) of anhydrous potassium carbonate and 150 ml of dimethylformamide. The reaction mixture was stirred for one hour at room-temperature and then 57.5 g (0.25 mol) of 1,5-dibromopentane were added. The mixture was heated for 4 hours on a water-bath after which 300 ml of water were added and the organic phase was decanted. The aqueous phase was washed with ether and the ethereal fraction was added to the organic phase. The two collected phases were washed with water, dried and evaporated to dryness. The residue so obtained was distilled under vacuum to eliminate the excess of 1,5-dibromo-pentane and the new residue was washed with methanol. (The operation of purification could also have been carried out by chromatographing the residue on a dry column using silica as adsorbent agent).

In this manner, 18.5 g of 2-ethyl-3-(4-ω-bromopentyloxy-benzoyl) benzofuran were obtained in the form of an oil, which represents a yield of 90%.

By following the same procedure as that described above but using the appropriate starting-product, the following compound was prepared:

| Compound | |
| --- | --- |
| 2-ethyl-3-(3,5-dimethyl-4-ω-bromopentyloxy-benzoyl)-benzofuran | oily - not crystallized | b. Preparation of 2-ethyl-3-(4-ω-di-n-propylaminopentyloxy-benzoyl)-benzofuran oxalate In a 250 ml flask, 4.15 g (0.01 mol) of 2-ethyl-3-(4-ω-bromo-pentyloxy-benzoyl)-benzofuran, 3.03 g (0.03 mol) of di-n-propylamine and 60 ml of benzene were heated to 40°–50C for 48 hours. The precipitate which formed was filtered out and the solvent and the excess amine were evaporated off. The residue so obtained was taken up in ether. The ethereal solution was washed with water, dried and then treated with a solution of oxalic acid in methanol.

In this manner, 0.5 g of 2-ethyl-3-(4-ω-di-n-propylaminopentyl-oxy-benzoyl)-benzofuran oxalate was obtained, melting at 151°C after recrystallization from ethyl acetate, which represents a yield of 8%.

By following the same procedure as that described above but using the appropriate starting-products, the following compounds were prepared:

| Compound | Melting point °C |
| --- | --- |
| 2-ethyl-3-(3,5-dimethyl-4-ω-di-n-propyl-aminopentyloxy-benzoyl)-benzofuran oxalate | 104 |
| 2-ethyl-3-(3,5-dimethyl-4-ω-di-n-butylamino-pentyloxy-benzoyl)-benzofuran oxalate | 73 |

EXAMPLE 8

Preparation of
2-ethyl-3-(4-ω-di-n-propylaminohexyloxy-benzoyl)-benzofuran oxalate a. Preparation of 2-ethyl-3-(4-ω-bromohexyloxy-benzoyl)-benzofuran Into a 500 ml flask fitted with a mechanical stirrer were introduced 13.3 g (0.05 mol) of 2-ethyl-3-(4-hydroxy-benzoyl)-benzofuran, 10.4 g (0.075 mol) of anhydrous potassium carbonate and 150 ml of dimethylformamide. The reaction mixture was stirred for one hour at room-temperature and then 61 g (0.25 mol) of 1,6-dibromohexane were added. The mixture was heated for 4 hours on a water-bath after which 300 ml of water were added and the organic phase was decanted. The aqueous phase was washed with ether and the ethereal fraction was added to the organic phase. The two collected phases were washed with water, dried and evaporated to dryness. The residue so obtained was distilled under vacuum to eliminate the excess of 1,6-dibromohexane and the new residue was washed with methanol. (The operation of purification could also have been carried out by chromatographing the residue on a dry column using silica as adsorbent agent).

In this manner, 19.6g of 2-ethyl-3-(4-ωbromohexyloxy-benzoyl)-benzofuran were obtained in the form of an oil, which represents a yield of 91%.

Following the same procedure as that described above but using the appropriate starting-product, the following compound was prepared:

| Compound | |
| --- | --- |
| 2-ethyl-3-(3,5-dimethyl-4-ω-bromohexyloxy-benzoyl)-benzofuran | oily - not crystallized | b. Preparation of 2-ethyl-3-(4-ω-di-n-propylaminohexyloxy-benzoyl-benzofuran oxalate In a 250 ml flask, 4.29 g (0.01 mol) of 2-ethyl-3-(4-ω-bromohexyloxy-benzoyl)-benzofuran, 3.03 g (0.03 mol) of di-n-propylamine and 60 ml of benzene were heated to 40°–50°C for 48 hours. The precipitate which formed was filtered out and the solvent and the excess amine were evaporated off. The residue so obtained was taken up in ether. The ethereal solution was washed with water, dried and then treated with a solution of oxalic acid in methanol. In this manner, 1 g of 2-ethyl-3-(4-ω-di-n-propylamnohexyoxy-benzoyl)-benzofuran oxalate was obtained, melting at 124°C after recrystallization from ethyl acetate, which represents a yield of 18%.

By following the same procedure as that described above but using the appropriate starting-products, the following compounds were prepared:

| Compound | Melting point °C |
| --- | --- |
| 2-ethyl-3-(3,5-dimethyl-4-ω-di-n-propyl-aminohexyloxy-benzoyl)-benzofuran oxalate | 68 |
| 2-ethyl-3-(3,5-dimethyl-4-ω-di-n-butyl-aminohexyloxy-benzoyl)-benzofuran oxalate | 73 |

EXAMPLE 9

Preparation of
2-n-butyl-3-(4-γ-n-propylaminopropoxy-benzoyl)-benzofuran hydrochloride To a solution of 18.3 g (0.044 mol) of 2-n-butyl-3-(4-

γ-bromo-propoxy-benzoyl)-benzofuran, prepared as described in the foregoing Example 3, in 150 ml of ethanol were added 18.3 ml (0.22 mol) of propylamine. The mixture was allowed to react for 84 hours at room temperature after which the reaction medium was evaporated to dryness. Water was added to the oily residue so obtained and the resulting mixture was extracted with ether. The ethereal phase was dried over sodium sulphate and the hydrochloride of the desired product was obtained by treating the ethereal phase with a solution of hydrochloric acid in ether. In this manner, 2.5 g of 2-n-butyl-3-(4-γ-n-propylaminopropoxy-benzoyl)-benzofuran hydrochloride were obtained, melting at 119°–121°C after recrystallization from ethyl acetate, which represents a yield of 13%.

By following the same procedure as that described above, but using the appropriate starting-products, the following compounds were prepared:

| Compound | Melting point °C |
|---|---|
| 2-n-butyl-3-(4-γ-methylaminopropoxy-benzoyl)-benzofuran hydrochloride | 109–111 |
| 2-n-butyl-3-(4-γ-ethylaminopropoxy-benzoyl)-benzofuran hydrochloride | 114.5–116 |
| 2-n-butyl-3-(4-γ-n-butylaminopropoxy-benzoyl)-benzofuran hydrochloride | 137–139 |
| 2-ethyl-3-(3,5-dimethyl-4-γ-n-propylamino-propoxy-benzoyl)-benzofuran hydrochloride | 150 |
| 2-ethyl-3-(3,5-dimethyl-4-γ-n-butylamino-propoxy-benzoyl)-benzofuran hydrochloride | 130 |
| 2-ethyl-3-(3,5-dimethyl-4-γ-isopropylamino-propoxy-benzoyl)-benzofuran hydrochloride | 193 |

EXAMPLE 10

Tablets were prepared by granulating and compressing the following ingredients in accordance with known pharmaceutical techniques:

| Ingredient | mg per tablet 100 mg tablets | 200 mg tablets |
|---|---|---|
| 2-cyclohexyl-3-(4-γ-di-n-butylaminopropoxy benzoyl)-benzofuran oxalate | 100.– | 200.– |
| Milk sugar | 100.– | 125.– |
| Corn starch | 77.5 | 130.5 |
| Polyvinylpyrrolidone | 6.– | 20.– |
| Alginic acid | 6.– | 10.– |
| Talc | 6.– | 10.– |
| Colloidal silica | 1.5 | 1.5 |
| Magnesium stearate | 3.– | 3.– |
|  | 300.– | 500.– |

We claim:

1. A compound of the formula:

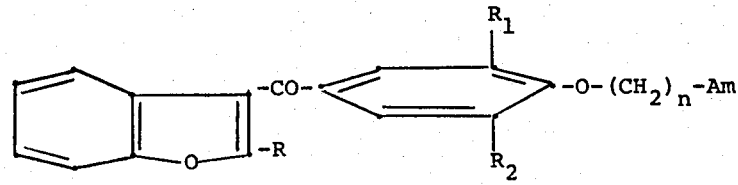

or a pharmaceutically acceptable acid addition salt thereof, wherein R represents branched- or straight-chain alkyl containing from 1 to 4 carbon atoms or cyclohexyl, $R_1$ and $R_2$, which are identical, each represent straight-chain alkyl containing from 1 to 3 carbon atoms, Am represents dimethylamino, diethylamino, di-n-propylamino, di-n-butylamino, piperidino, N-methyl-piperazino, N-ethyl-piperazino, N,n-propyl-piperazino, N-phenyl-piperazino, methyl-n-butylamino, ethyl-n-butylamino, methylamino, ethylamino, n-propylamino, isopropylamino or n-butylamino and n is an integer in the range of from 3 to 6 inclusive.

2. 2-Cyclohexyl-3-(4-γ-di-n-butylaminopropoxy-benzoyl)-benzofuran or a pharmaceutically acceptable acid addition salt thereof.

3. 2-Ethyl-3-(3,5-dimethyl-4-γ-di-n-butyl-amino-propoxy-benzoyl)-benzofuran or a pharmaceutically acceptable acid addition salt thereof.

4. 2-n-propyl-3-(3,5-dimethyl-4-γ-di-n-butylamino-propoxy-benzoyl)-benzofuran or a pharmaceutically acceptable acid addition salt thereof.

* * * * *